Patented July 26, 1938

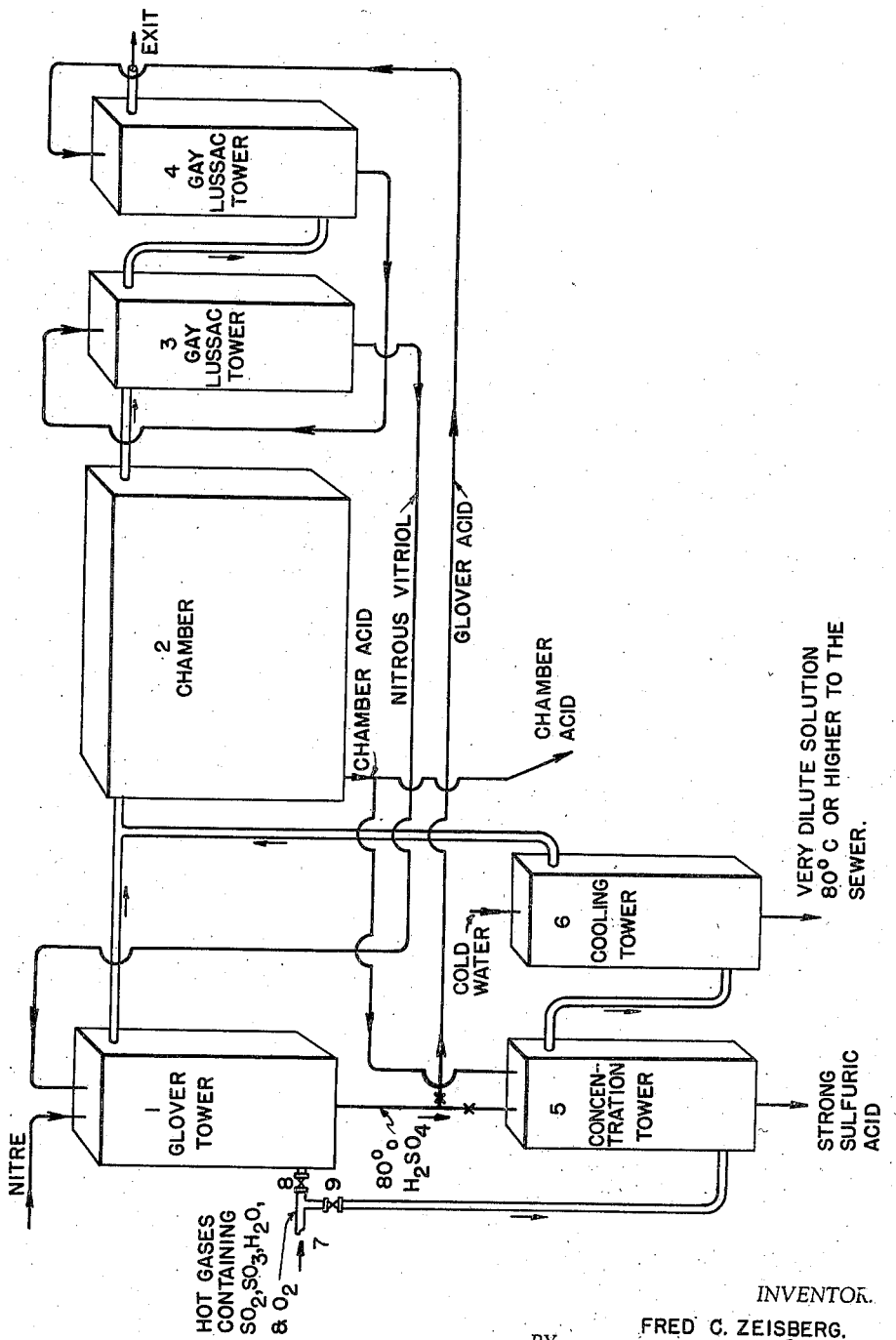

2,125,143

UNITED STATES PATENT OFFICE 2,125,143

PROCESS OF RECOVERING SULPHURIC ACID FROM HOT GAS MIXTURES CONTAINING SULPHUR OXIDES

Fred C. Zeisberg, Wilmington, Del., assignor to E. I. du Pont de Nemours & Company, Wilmington, Del., a corporation of Delaware Application January 24, 1936, Serial No. 60,567

4 Claims. (Cl. 23—167)

The present invention relates to the production of sulphuric acid of at least two different strengths, of which one is at least 90% $H_2SO_4$, from a hot gas mixture comprising sulphur dioxide, sulphur trioxide and water vapor, the latter two of which may be more or less combined as sulphuric acid; it consists, in its broadest embodiment, in adapting the lead chamber sulphuric acid manufacturing process to this particular type of gas mixture and in so handling this hot gas that a part of the gas follows the standard practice in denitrating the nitrous vitriol, the balance of the gas is then treated to abstract therefrom its $SO_3$ content whereby concentrated acid is produced, the water vapor remaining in this treated gas is then condensed and the $SO_2$ obtained in this manner is then reunited with the original gas after it has been charged with nitrous oxide and the combined gases are then transformed into sulphuric acid in the standard chamber process.

Gas mixtures containing besides $SO_2$ substantial amounts of $SO_3$ and water vapor, which may be partially combined as $H_2SO_4$, are produced in various technical operations such as, for instance, in processes of recovering the sulphuric acid or its equivalent from spent pickle liquors or from by-product copperas and waste acid obtained in the manufacture of titanium pigments.

It is, however, very difficult economically to handle such gas mixtures in a lead chamber system. Assuming that such a gas mixture is led into a Glover tower; the sulphuric acid, sulphur trioxide and some of the water will condense and the sulphur dioxide which is not converted in the Glover tower passes on to the chamber. The chamber operations require, however, that the acid discharged from the Glover tower have a strength not greater than about 80% $H_2SO_4$, because above this strength denitration becomes too difficult; it requires, further, that the acid produced in the chambers proper have a strength not lower than about 60% $H_2SO_4$, because below this strength nitrous corrosion becomes excessive. It is, however, exceedingly difficult to satisfy these conditions with hot gases which contain large amounts of $SO_3$ and water vapor. These moist gases create another difficulty, namely, the water content of the hot gaseous mixture, whose sulphur compound it is desired to recover, may be too high to permit its introduction into the chamber system at all.

These difficulties are obviated in operating according to my invention and this process is so devised as to adapt itself to various compositions in respect to $SO_2$, $SO_3$, $H_2SO_4$, and $H_2O$ content, it being understood that the gas as available should be at a temperature of at least 50° C. above the dew point of the particular gas mixture used.

The attached drawing gives in a schematic manner the outline of my process when applied to a standard type lead chamber system. Gas fans, pumps, coolers, and other standard equipment needed for running a chamber plant are not shown or described in detail as they are well known and are not part of my invention.

No. 1 in this figure represents a standard type Glover tower, followed by 2 which represents the lead chamber, Nos. 3 and 4 are Gay-Lussac towers in which the nitrous oxides are recovered, the nitrous vitriol produced circulating from tower 4 over 3 and is finally led over the Glover tower. The novel equipment required in my process is represented as 5—a concentrating tower, and 6—a cooling tower; these towers can be similar in construction to Glover towers, though their functions will be different.

The hot sulphur gases containing $SO_2$, $SO_3$, $H_2O$, $H_2SO_4$, and $O_2$ are received through pipe 7. At this point, the gas is split up into a minor flow which is controlled by valve 8 and a major flow, controlled by valve 9.

The minor flow of gas which can, for instance, constitute 25% of the total gas is led into the bottom of the Glover tower 1. This tower functions as a denitrating tower for the nitrous vitriol obtained in tower 3. The gas flow through this tower is so regulated as no more than to denitrate this nitrous vitriol and concentrate it to about 80% $H_2SO_4$. The acid draining from this tower contains more $H_2SO_4$ than is supplied to it as nitrous vitriol. It is, therefore, divided into two streams, one, which is cooled, containing sufficient acid for feeding the Gay-Lussac towers 4 and 3, and the other, the excess acid resulting from the condensation of the $H_2SO_4$ and $SO_3$ in said minor flow and that formed in the Glover tower by the conversion of $SO_2$, which second part will be utilized uncooled in tower 5 as will be explained below. Also to tower 1 is added the niter, any any form desired, necessary to make up the niter losses of the whole system. The minor flow of gas charged with nitrous oxides emerges from the upper part of tower 1.

The major gas flow passing valve 9 enters the bottom of tower 5. To the top of this tower is supplied the excess Glover acid from tower 1 and an additional amount of weaker acid obtained in the chamber set 2.

The conditions in this tower are so regulated that the hot incoming gases concentrate the acid added to the tower and combine it with the $SO_3$ and $H_2SO_4$ contained in the gas stream to form an acid of a concentration of at least 90% $H_2SO_4$, or stronger if desired. This strong acid is recovered at the bottom of tower 5 and represents one of the valuable products of my process.

The gases leaving the top of tower 5 contain $SO_2$ and $H_2O$ and are maintained sufficiently hot in tower 5 to prevent condensation of water in this tower. Under some circumstances, such, for example, as when very strong acid is produced in tower 5, these gases may also contain a small amount of $SO_3$, free or combined with water. Cold water is sprayed upon the packing on top of tower 6 and the gas led into the bottom of the tower. The amount of water circulated in tower 6 in contact with the gas stream is so regulated that the liquid discharged from the bottom of the tower has a temperature of 80° C. or higher. In this tower a large portion of the water content of the gas is condensed, as well as any $SO_3$, which may be present after passage through tower 5. By discharging the condensate hot it contains very little $SO_2$ and this condensate is most conveniently run to the sewer unless a local use exists for such a very dilute sulphuric acid.

The cool gases emerging from top of tower 6 contain $SO_2$ and only as much $H_2O$ as corresponds to the partial water pressure of the cooling spray used.

These residual $SO_2$ gases from the major original gas flow are now joined with the gas stream obtained after passing the minor flow of gas through the Glover tower, and the combined flow is passed into chamber system 2, where it is converted into sulphuric acid. The art of chamber acid practice is well known, and as my invention does not affect the treatment of the gases once they have entered the lead chambers, no detailed description of this part of the process is required.

It will be evident that this process permits the production from a hot gaseous mixture containing $SO_3$, $SO_2$, $H_2O$, $H_2SO_4$, and $O_2$ of the maximum amount of strong acid which the heat content of this gas mixture is capable of producing and at the same time recovering at chamber acid strength the balance of the sulphur content of the gas. If the gas is hot enough the entire sulphur content of the gas mixture can be recovered as 66° Bé. acid, even though the gas mixture may contain an excessive amount of water. It is also clear that because this water content is removed as such from the gas mixture, no disturbance of the processes occurring in the chamber set because of excessive water, or water improperly distributed, can occur. Finally it is clear that the process possesses great flexibility, being operable on gases of widely varying temperature, and with widely varying ratios among the $SO_2$, $SO_3$, $H_2SO_4$, and $H_2O$ contents.

Merely as one example of the operation of this process, a gas mixture containing the following constituents by volume:

| | |
|---|---|
| $CO_2$ | 3.9 |
| $H_2O$ | 13.5 |
| $N_2$ | 64.0 |
| $O_2$ | 7.6 |
| $SO_2$ | 8.3 |
| $SO_3$ (free or combined) | 2.7 |
| | 100.0 | and having a temperature of 550° C., was supplied to the process. Of this gas 75% was sent to tower 5 and 25% to tower 1. For each 100 lbs. total gas supplied to the process 32.7 lbs. $H_2SO_4$ at a strength of 91.8% was delivered from tower 5, into which was put all of the acid produced in chamber set 2 and the excess acid produced in tower 1. The gas entering tower 6 had a temperature of 150° C. About 22.5 gal. water at a temperature of 21° C. was sprayed on top of this tower for every 100 lbs. original gas. The gas leaving the top of this tower had a temperature of 35° C. and carried about 1% of the water in the original gas. The liquid discharged at the bottom of the tower had a temperature of 85° C., was free from $SO_2$ and contained about 0.10% of $H_2SO_4$. It is thus seen that by means of this process substantially all (97.4%) of the sulphur compounds in the gas was recovered as sulphuric acid of 91.8% strength. It would have been possible, by not using all of the chamber acid on tower 5, to produce an acid of 93, 94 or 95% at the discharge of tower 5, but in that case a corresponding amount of chamber acid would have had to be delivered at a strength around 65% $H_2SO_4$, and the acidity of the wash liquor discharged from tower 6 would have increased somewhat.

In other words, the overall recovery of sulphur compounds decreases as the strength of the acid delivered from tower 5 increases, unless some use exists for the weakly acid liquor from tower 6.

I claim:

1. The process of producing sulphuric acid of at least two different concentrations from a hot gas mixture comprising $SO_2$, substantial amounts of $SO_3$ and water vapor more or less combined, and oxygen, the steps of (1) splitting said gas into a minor and a major flow, (2) passing said minor flow of hot gases through a Glover tower in which the flow of gas becomes charged with nitrous oxides, (3) passing said major flow of gas into a concentration tower in which it is contacted with sulphuric acid, part of which at least originates in said Glover tower, maintaining the flow of hot gas and acid in said tower at such rates that the acid is concentrated to at least 90% strength $H_2SO_4$ and the gases are not cooled below 150° C., (4) passing the gases emerging at a temperature of at least 150° C. from said concentrating tower through a cooling tower in which said gases are contacted with cold water and regulating the conditions in said cooling tower to condense water in said cooling tower, and maintaining the liquid effluent of this tower above 80° C., (5) re-uniting said cooled gases coming from said major flow with the gases of the minor flow as they emerge after passage through said Glover tower and, (6) passing the combined flow of gases through a lead chamber system and its appurtenances, in which the gases are converted into sulphuric acid.

2. In a process for producing sulphuric acid from a hot gaseous mixture comprising $SO_2$ and substantial amounts of $SO_3$ and $H_2O$, the steps of employing a portion of said gaseous mixture to denitrate nitrous vitriol, subjecting the balance thereof to cooling treatment under such conditions as to condense $SO_3$ and $H_2SO_4$ therefrom, thence subjecting said gaseous mixture to additional cooling, and under such conditions as to condense substantially all of the $H_2O$ present therein without effecting removal of the $SO_2$ present, said additional cooling being effected by contacting said gaseous mixture with water in a tower, the liquid effluent from which is maintained above 80° C., discarding the $H_2O$ condensate from the system, reuniting the $SO_2$-containing gas remaining with the portion of said gaseous mixture employed in denitrating nitrous vitriol, and submitting the reunited gas mixture to a chamber sulphuric acid producing reaction.

3. A process for treating a hot gaseous reaction mixture containing $SO_2$ and a high proportion of $SO_3$ and $H_2O$ to produce sulphuric acid therefrom, comprising separating a portion of said gaseous mixture and charging the same with nitrous oxides, contacting the balance of said gas with a body of sulphuric acid under such conditions that $SO_3$ is condensed from said gas, said acid becomes concentrated to at least 90% strength and said gas is cooled to a point not below 150° C., further cooling and concentrating said gaseous mixture by contacting the same with water in a tower, the liquid effluent from which is maintained above 80° C. to condense and remove substantially all of the $H_2O$ present therein, without removing its $SO_2$ content, discarding the resultant $H_2O$ condensate from the system, reuniting the water-removed portion of said gaseous mixture with the nitrous-oxide-charged portion thereof, and subjecting the reunited mixture to conventional chamber sulphuric acid producing reaction.

4. A process for treating a hot gaseous reaction mixture containing $SO_3$ and relatively high proportions of $SO_3$ and $H_2O$ to produce sulphuric acid therefrom, comprising charging a separated portion of said gaseous mixture with nitrous oxides, contacting the remainder of said gases with a body of sulphuric acid under such conditions that $SO_3$ present therein is condensed, said acid becomes concentrated to at least 90% strength and said gases are cooled to a point not below 150° C., further cooling and concentrating said gaseous mixture by contacting the same with water in a tower, the liquid effluent from which is maintained above 80° C. to condense substantially all of the $H_2O$ present therein without effecting removal of its $SO_2$ content, removing from the system while hot the resultant $H_2O$ condensate, uniting said nitrous-oxide-charged portion of said gaseous mixture with the portion subjected to cooling treatment and $H_2O$ removal, and thereafter subjecting the reunited gaseous mixture to a chamber sulphuric acid producing reaction.

FRED C. ZEISBERG.